Figure 1:
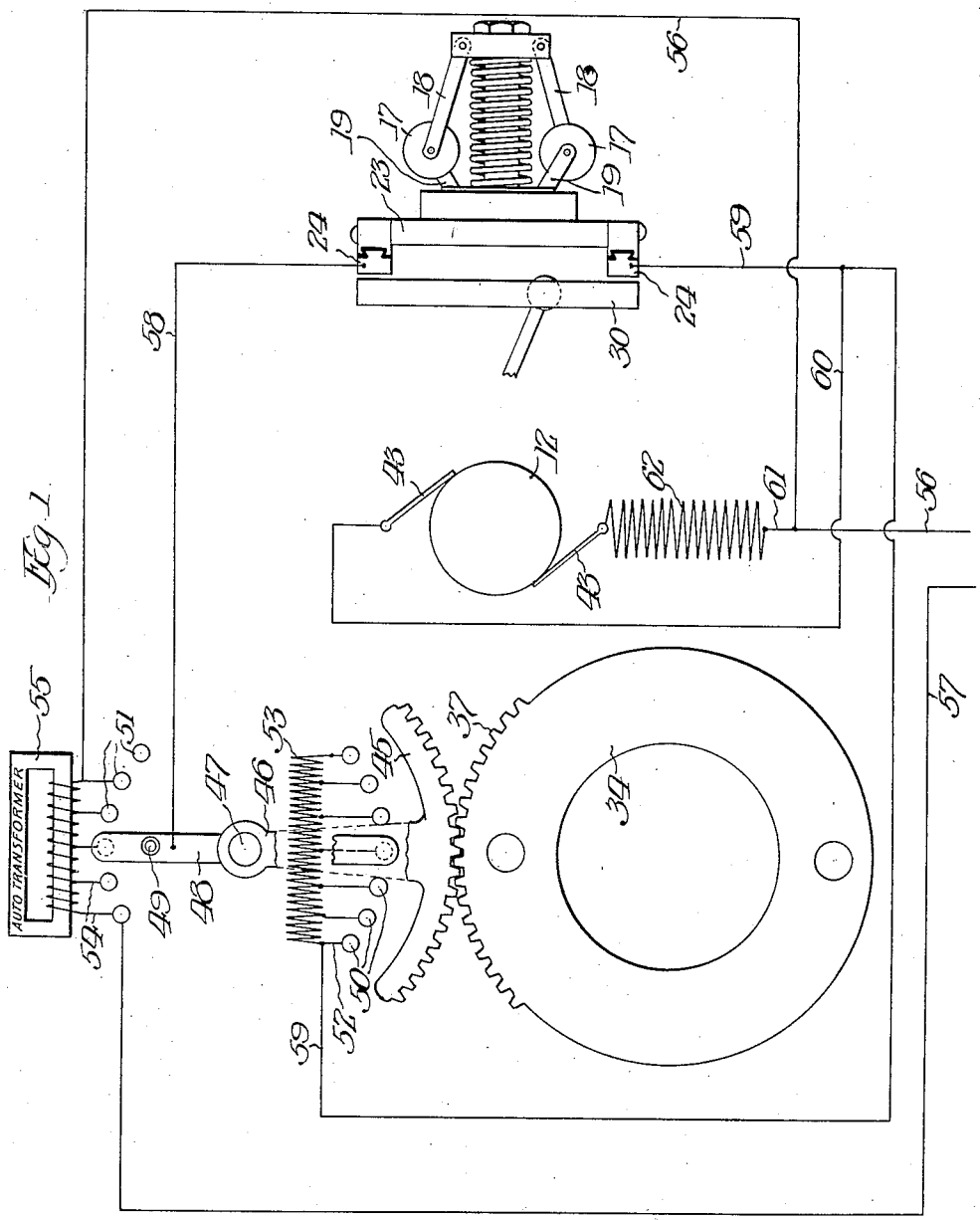

A. KIMBLE & J. D. NIES.
ADJUSTABLE SPEED CONTROL FOR ELECTRIC MOTORS.
APPLICATION FILED OCT. 10, 1913.

1,128,005.

Patented Feb. 9, 1915.
3 SHEETS—SHEET 1.

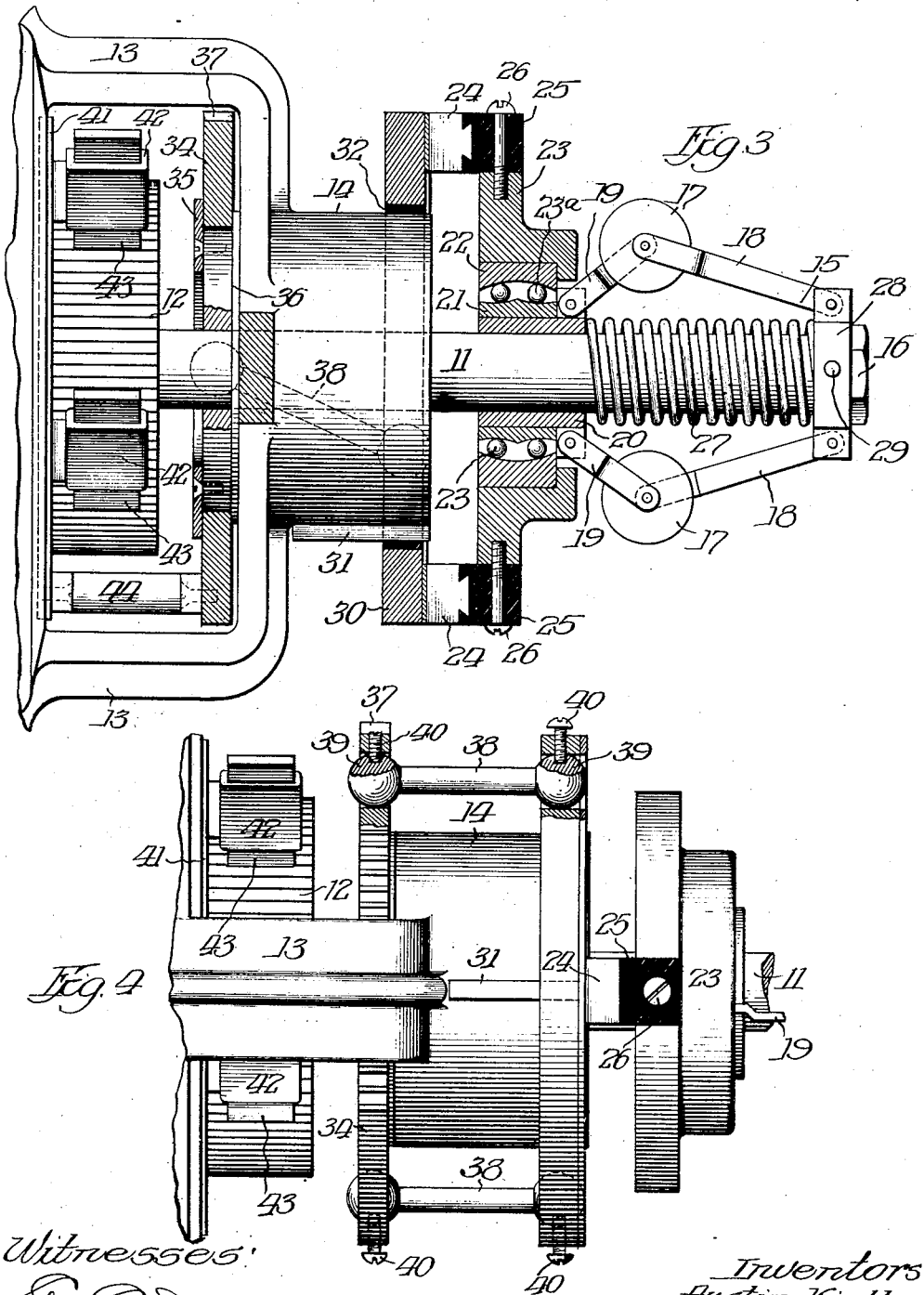

UNITED STATES PATENT OFFICE.

AUSTIN KIMBLE, OF OAK PARK, AND JOHN D. NIES, OF ST. CHARLES, ILLINOIS, ASSIGNORS TO KIMBLE ELECTRIC COMPANY, OF CHICAGO, ILLINOIS, A CORPORATION OF ILLINOIS.

ADJUSTABLE SPEED CONTROL FOR ELECTRIC MOTORS.

1,128,005. Specification of Letters Patent. Patented Feb. 9, 1915.

Application filed October 10, 1913. Serial No. 794,382.

*To all whom it may concern:*

Be it known that we, AUSTIN KIMBLE and JOHN D. NIES, both citizens of the United States, residing at Oak Park, in the county of Cook and State of Illinois, and St. Charles, in the county of Kane, State of Illinois, respectively, have invented certain new and useful Improvements in Adjustable Speed Control for Electric Motors, of which the following is a specification.

Our invention relates to speed control mechanism for electric motors, and refers particularly to a speed control device which will produce gradual changes of speed in a motor over a wide range of speed variations.

Our improved speed control device refers to that class of apparatus in which the current is supplied to a motor through a circuit which is controlled by make-and-break mechanism, whereby when the speed of the motor exceeds a predetermined amount the circuit is opened and the speed of the motor then decreases until the circuit is again closed. This make-and-break device is controlled by a governor, of the well-known type. Instead of making and breaking the circuit we may also (and this is the preferred form of our invention) shunt the current through a resistance so that the voltage and amount of current supplied to the motor is decreased when the speed exceeds a predetermined amount.

We are aware that speed control devices of the general type which we have just described are old, but our invention relates to improvements applied to this general class of speed controllers by means of which greatly superior results are obtained.

One of the principal objects of our invention consists in the ready adjustability of the mechanism for determining the motor speed at which the circuit controlling the motor shall be opened or the current shunted through resistance, as previously described.

A further object of our invention consist in the provision of means for obtaining a uniform contact pressure of the contacts of the speed controlling device when the latter is brought into engagement with the connecting member, whose function it is to afford electrical connection between the contacts of the speed control member, whereby the normal operating circuit of the motor is closed.

A further object of our invention consists of a simultaneous regulation of the connecting member and the voltage of the current which is supplied to the motor. And a still further object of our invention consists in the simultaneous regulation of the position of the motor brushes and the connecting member above mentioned, either with or without the added simultaneous regulation of the voltage of the current supplied to the motor.

These and other advantages of our invention will be more readily understood by reference to the accompanying drawings, which show a preferred embodiment of our invention, and in which—

Figure 2:
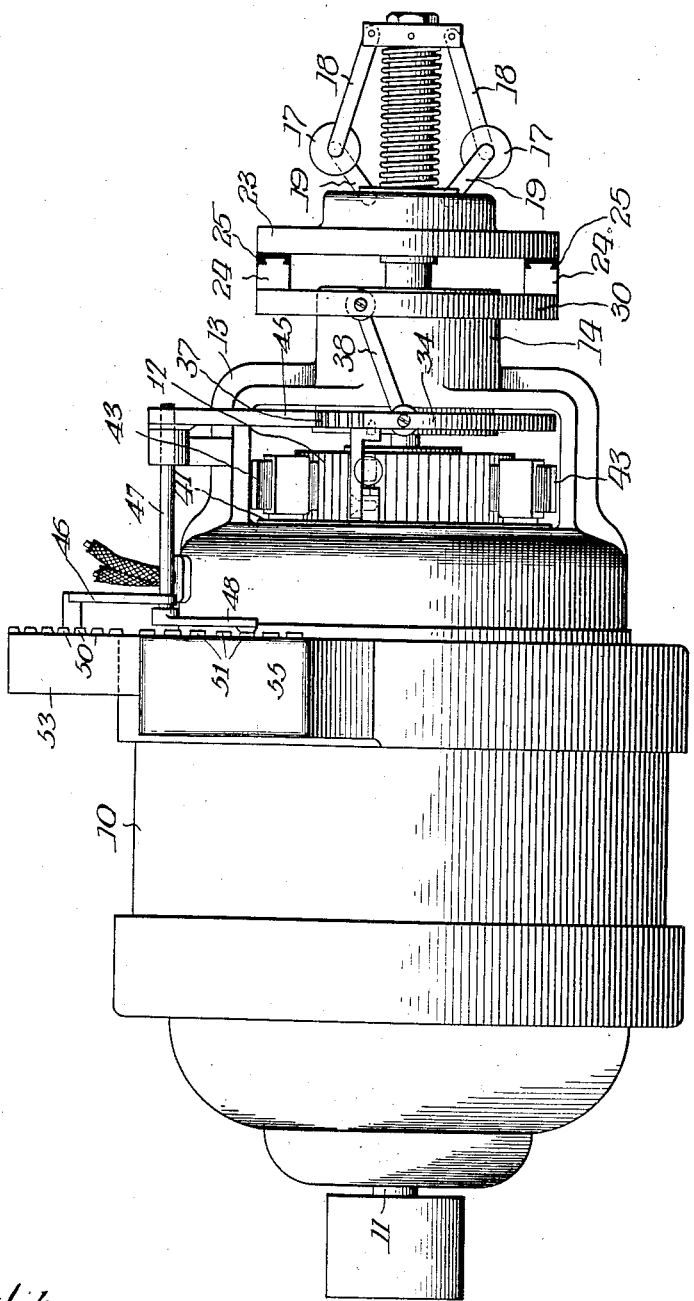

Figure 1 is a diagrammatic representation of the circuits and operating devices for effecting the motor speed control; Fig. 2 is a side elevation of a motor to which our speed controlling mechanism has been applied; Fig. 3 is an enlarged vertical section through the speed controlling mechanism applied to the motor; and Fig. 4 is a side elevation and partial sectional view of the parts shown in Fig. 3, with the governor omitted, this side elevation being taken at an angle of 90° to the position of the parts shown in Fig. 3.

In order that the operation of our improved speed control as a whole may be more readily understood, we will first proceed with a detailed description of the speed control mechanism which is applied to the motor, and will then describe the various electrical connections used with such mechanism.

Referring to Figs. 2, 3 and 4, the motor 10, having the usual armature shaft 11 and commutator 12, has attached to its casing the frame 13, integral with which is the drum 14. The armature shaft 11 passes through the drum 14, which forms a bearing for the same. Mounted on the outer end of the armature shaft 11 is the governor 15, attached to the armature shaft by means of the bolt 16. This governor is of the well-known type, being provided with the weights 17 carried by the links 18 and 19. The links 19 are pivotally connected to the bushing 20 inclosing the armature shaft 11 and longitudinally movable thereon. The bushing 20 is provided with the bearing ring 21, which, with the bearing ring 22, forms a runway for the balls 23ᵃ. The bearing member 22 is attached to the contact-maker 23 to which the contacts 24, 24 are fastened through the instrumentality of the insulating blocks 25, 25 and the screws 26, 26. The spring 27 incloses the armature shaft 11, and has its bearing on one end against the bushing 20 and on the other against the collar 28 of the governor 15, this collar being fastened to the armature shaft 11 by means of the pin 29 as well as the bolt 16. It will be evident that the spring 27 normally tends to move the bushing 20 and its attached parts to the left from the position indicated in Fig. 3.

The connecting ring 30 incloses the drum 14, and has a feathered connection therewith by means of the spline 31 on the drum which engages a suitable recess in the connecting ring 30. This connecting ring is preferably made of copper, brass, or other suitable electrically-conducting material, and is provided on its inner periphery with the insulation 32. Under normal conditions the contacts 24 of the contact-maker 23 engage the connecting ring 30, being held in engagement therewith by the spring 27. The regulator ring 34 is rotatably mounted on the drum 14, being held in position by the collar 35 and the shoulder 36 on the drum 14. A portion of the regulator ring is provided with the gear teeth 37, the object of which will be explained hereafter. As most clearly shown in Fig. 4, the spacers 38, each of which has on its ends the balls 39, are connected to the regulator ring 34 and the connecting ring 30 by means of the screws 40. As the regulator ring 34 is rotated, the end of each spacer 38 which is connected to the regulator ring is moved around with it, but inasmuch as the connecting ring 30 cannot rotate on account of the spline 31, the connecting ring is moved longitudinally along the drum 14 by the rotation of the regulator ring.

The motor is provided with a rotatable brush-holder frame 41 carrying the brush-holders 42. These brush-holders in turn carry the brushes 43, which engage the commutator 12. The brush-holder frame 41 is connected with the regulator ring 34 by means of the bars 44, so that when the regulator ring 34 is rotated the brush-holder frame 41 is correspondingly rotated and the position of the brushes 43 on the commutator is varied.

Turning now to Fig. 1, which is a diagrammatic representation of the electrical and mechanical connections used with our improved speed control device; the regulator ring 34 is, for the sake of simplicity, shown in end elevation. The gear teeth 37 are engaged by the corresponding teeth of the gear segment 45, which has the arm 46 rigidly mounted on the shaft 47. Also rigidly mounted on the shaft 47 is the switch arm 48 provided with the handle 49. On one end the switch arm 48 is adapted to engage any one of the contacts 50 and on its opposite end is adapted to engage any one of the contacts 51. Leading from each of the contacts 50 is a conductor 52. These conductors 52 lead to various points in the resistance 53. Any form of resistance 53, as, for example, an impedance coil, may be used. From each of the contacts 51 a conductor 54 leads to a different point on the winding of the auto transformer 55.

Current is supplied to the auto transformer 55 through the conductor 56 attached to one end of the winding of the transformer and the conductor 57 attached to the opposite end. The conductor 58 leads from the switch arm 48 to one of the contacts 24 of the contact-maker 23, and a conductor 59 leads from the other contact member 24 to the resistance 53. The conductor 60 leads from one point of the conductor 59 to one of the brushes 43, and the conductor 61 leads from the conductor 56 to the coil 62, which, in turn, is connected to the other brush 43 engaging the commutator 12.

Having thus described the construction of the various parts used in our invention, the operation of the same may now be readily understood. Current comes from the main conductors 56 and 57 to the auto-transformer 55. The current also passes directly from the conductor 56 through the conductor 61 and the coil 62 to one of the brushes 43, thence through the commutator and armature windings of the series-wound motor to the other brush 43, and thence through the conductor 60 to the conductor 59. If the contacts 24 of the contact-maker are not in engagement with the connecting ring 30, the current then passes through conductor 59 to the resistance 53. The current next passes through this resistance and one of the conductors 52 to the contact 50, with which the switch arm 48 is connected, then through the switch arm itself to a contact 51, and thence through one of the conductors 54, back to the winding of the auto-transformer 55, thereby completing the circuit. On the other hand, if the contacts 24, 24 of the contact-maker 23 are in engagement with the connecting ring 30, the current passes directly from conductor 59 through one of the contacts 24, through the connecting ring 30 to the other contact 24, and thence through the conductor 58 back to the switch arm 48, and thence to the auto-transformer 55 through one of the contacts 51 and the conductor 54, as previously described. It will therefore be evident that when the contacts 24 engage the connecting ring 20 the resistance 53 is entirely cut out. In place of using a resistance 53 for the purpose of shunting the current, this resistance may be entirely eliminated if desired, the circuit being entirely opened when the contacts 24 are removed from engagement with the connecting ring 30.

When it is desired to operate the motor at any given speed the switch arm 48 is adjusted with relation to the auto-transformer 55 so that such speed will result, the regulator ring 34 being correspondingly rotated through the instrumentality of the gear segment 45 to also adjust the position of the connecting ring. So long as the contacts 24, 24 remain in engagement with the connecting ring 30 the speed of the motor will be normally that corresponding to the voltage supplied by the current coming from the auto-transformer 55. If the speed of the motor increases, the weights 17 of the governor will be thrown out by centrifugal force and the contact-maker will be moved so that the contacts 24 are withdrawn from the connecting ring 30. This causes the current to pass through the resistance 53 according to the course previously traced, and the speed of the motor will decrease until the contacts 24 are again brought into engagement with the connecting ring 30. It will be evident that by the use of the balls 23ª the contacts 24 of the contact-maker 23 are able to adjust themselves to the surface of the connecting ring 30 so that an equal pressure is maintained by both of the contact members and the connecting ring, the ball bearings allowing the contact-maker to be tilted with respect to the axis of the armature shaft. Moreover, this ball bearing is further of advantage since it reduces the friction between the bearing member 21 and the bearing member 22 of the contact-maker. It will be observed that the contact-maker may rotate, but this rotation does not take place while the contact members 24 are in engagement with the connecting ring 30.

If it is desired to increase the speed of the motor the upper portion of the switch arm 48, shown in Fig. 1, is moved to the left so that more voltage is supplied to the motor. At the same time, through the instrumentality of the gear segment 45, the brushes 43 are shifted on the commutator and the contact ring 30 is moved in a direction away from the commutator so that the contacts 24 will remain in engagement with the connecting ring 30 until the armature shaft attains this increased speed. Similarly, if it is desired to decrease the speed of the motor, the upper portion of the switch arm 48 is moved to the right, thereby cutting down the voltage, shifting the brushes in the opposite direction, and moving the connecting ring 30 toward the commutator 12. It will be observed that as the voltage supplied to the motor is increased the amount of resistance element 53 which is included in the circuit when the contacts 24 are removed from the connecting ring 30 is increased, and vice versa.

It will be apparent to those skilled in the art that many changes could be made in the detailed construction of the various parts which we have described without departing from the spirit or scope of our invention.

What we claim is:

1. In a speed controlling device for electric motors, the combination of a governor, a contact-maker controlled by said governor, connecting means adapted to be engaged by said contact-maker, and common means for varying the position of said connecting means and regulating the voltage of the current supplied to said motor, substantially as described.

2. In a speed controlling device for electric motors, the combination of a governor, a contact-maker controlled by said governor, connecting means adapted to be engaged by said contact-maker, a rotatable brush-holder, and common means for varying the position of said brush-holder and said connecting means, substantially as described.

3. In a speed controlling device for electric motors, the combination of a governor, a contact-maker controlled by said governor, connecting means adapted to be engaged by said contact-maker, a rotatable brush-holder, and common means for varying the position of said brush-holder and said connecting means and regulating the voltage of the current supplied to said motor, substantially as described.

4. In a speed controlling device for electric motors, the combination with the armature shaft, of a governor mounted on said shaft, a contact-maker longitudinally movable on said shaft and controlled by said governor, connecting means adapted to be engaged by said contact-maker and being longitudinally movable in the direction of the axis of said shaft, a rotatable regulating ring, and means for converting the rotatable movement of said regulating ring into longitudinal movement of said connecting means, substantially as described.

5. In a speed controlling device for electric motors, the combination of a governor, a contact-maker controlled by said governor, connecting means adapted to be engaged by said contact-maker, resistance means in the motor circuit, and common means for regulating the position of said connecting means and the amount of resistance in said circuit, substantially as described.

6. In a speed controlling device for electric motors, the combination of a governor, a contact-maker controlled by said governor, connecting means adapted to be engaged by said contact-maker, resistance means in the motor circuit, and common means for regulating the position of said connecting means, the amount of resistance in said circuit, and the voltage of the current supplied to said motor, substantially as described.

7. In a speed controlling device for electric motors, the combination of a governor, a contact-maker controlled by said governor, connecting means adapted to be engaged by said contact-maker, resistance means in the motor circuit, a rotatable brush holder, and common means for regulating the positions of said connecting means and said brush holder and the amount of resistance in said circuit, substantially as described.

8. In a speed controlling device for electric motors, the combination of a governor, a contact-maker controlled by said governor, connecting means adapted to be engaged by said contact-maker, resistance means in the motor circuit, a rotatable brush holder, and common means for regulating the positions of said connecting means and said brush holder, the amount of resistance in said circuit, and the voltage of the current supplied to said motor, substantially as described.

9. The combination with an electric motor, of a circuit therefor, an automatic switch adapted to be set for a predetermined motor speed, a resistance in shunt with said switch, and means common to the resistance and the switch for setting the switch and the resistance for predetermined motor speeds.

10. The combination with an electric motor, of a circuit therefor, a governor-controlled switch adapted to close said circuit, a resistance in shunt with said switch, whereby said circuit is closed through said resistance when said switch is open, and means for simultaneously setting the switch and the resistance for predetermined motor speeds.

AUSTIN KIMBLE.
JOHN D. NIES.

Witnesses:
  PERKINS B. BASS,
  JAMES K. BASS.